United States Patent [19]

Chang

[11] Patent Number: 4,582,397
[45] Date of Patent: Apr. 15, 1986

[54] DIOSPERSIVE ACOUSTO-OPTIC FILTER

[76] Inventor: I-Cheng Chang, 649, Nashua Ct., Sunnyvale, Calif. 94087

[21] Appl. No.: 478,800

[22] Filed: Mar. 25, 1983

[51] Int. Cl.[4] .......................... G02B 5/30; G02F 1/33; G02F 1/11
[52] U.S. Cl. ..................................... 350/372; 350/358
[58] Field of Search ................ 350/358, 371, 372, 373

[56] References Cited

U.S. PATENT DOCUMENTS

| | | | |
|---|---|---|---|
| 3,679,288 | 7/1972 | Harris | 350/358 |
| 3,953,107 | 4/1976 | Yano et al. | 350/372 |
| 4,052,121 | 10/1977 | Chang | 350/372 |
| 4,500,178 | 2/1985 | Yeh | 350/400 |

OTHER PUBLICATIONS

Harris et al., "Acousto-Optic Tunable Filter", Jun. 1969, 744-747, Journal of the Optical Society of America, vol. 59, No. 6.
Chang, "Noncollinear Acoustu-Optic Filter with Lame Angular Aperture", Applied Physics Letters, Oct. 1974, vol. 25, pp. 370-372.
Yano et al., "New Non-Collinear Acousto-Optic Tunable Filter Using Birefringence in Paratellurne", Applied Physics Letters, Mar. 1974, vol. 24, p. 256-257.
Chang, "Acousto-Optic Tunable Filters", Optical Engineering, Nov. 1981, vol. 20, No. 6, pp. 824-829.
Yeh, "Zero Crossing Birefringent Filters", Optics Communications, Oct. 1980, vol 35, No. 1, pp. 15-19.
Chandrasetiharan et al., "Anomalous Dispersion of Birepinsnce of Sapphire and Magnesium Fluoride in the Vacuum Ultraviolet", Applied Optics, vol. 8, No. 3, Mar. 1969, pp. 671-675.

Primary Examiner—John K. Corbin
Assistant Examiner—Bruce S. Shapiro

[57] ABSTRACT

An electronically tunable optical filter using acousto-optic interaction in a dispersive birefrigent crystal. The strong wavelength dispersion of birefringence in a class of uniaxial semiconductors near the band gap is utilized to enhance the spectral resolution of the tunable acousto-optic filter. The dispersive tunable acousto-optic filter provides a very large aperture while maintaining an extremely narrow bandwidth.

8 Claims, 3 Drawing Figures

DIOSPERSIVE ACOUSTO-OPTIC FILTER

BACKGROUND OF THE INVENTION

1. Field of the Invention

This invention relates to the field of electronically tunable optical filters utilizing acousto-optic effect in a birefringent crystal.

2. Description of Prior Art

Electronically tunable optical filters have been constructed so that a cone of light of first polarization is diffracted by an acoustic wave in a birefringent crystal to shift from the first to a second polarization of the light beam at a selected bandpass of optical frequencies. The center wavelength of the passband of this type of filter is electronically tunable by changing the frequency of the acoustic wave within the crystal.

Two basic types of tunable acousto-optic filters have been constructed: collinear and noncollinear. In the collinear filter, the incident and diffracted light beams inside the birefrigent crystal are collinear with the acoustic beam. The diffracted light beam at the selected passband is separated from the incident light beam by crossed polarizers. The collinear type of acousto-optic filter is disclosed in an article entitled "Acousto-Optic Tunable Filters" appearing on pages 744-747 in the June, 1969 issue of *The Journal of the Optical Society of America* (Vol. 59, No. 6), and in U.S. Pat. No. 3,679,288 entitled "Tunable Acousto-Optic Method and Apparatus."

In the noncollinear filter, the light beams inside the birefringent crystal are noncollinear with the acoustic beam. The diffracted light beam at the passband is selected from the incident light beam by either crossed polarizers or spatial separations. The noncollinear type of acousto-optic filter is disclosed in an article entitled "Noncollinear Acousto-Optic Filter with Large Angular Aperture" appearing on pages 370-372 of the Oct. 15, 1974 issue of the *Applied Physics Letters* (Vol. 25), and in U.S. Pat. No. 4,052,121 entitled "Noncollinear Tunable Acousto-Optic Filter."

In both the colliner and noncollinear types of tunable acousto-optic filters, the acousto-optic diffraction occurs for a narrow-band of optical frequencies satisfying the relation that the sum of the momentum vectors of the incident light waves and acoustic waves equal the momentum vector of the diffracted light wave. More significantly, this narrow filter bandpass can be maintained for incident light having a distribution of incident directions. This large angular aperture characteristic is due to the proper choice of acousto-optic interaction geometry wherein the tangents to the loci of incident and diffracted light wavevectors are parallel. When the "parallel tangents" condition is met, the acousto-optic diffraction becomes relatively insensitive to the angle-of-light incidence, a process that is referred to as "non-critical phase-matching." For the remainder of this disclosure, "tunable acousto-optic filter" will be defined as an optical filter that operates on the basis of acousto-optic diffraction in a birefringent crystal wherein the non-critical phase matching condition is satisfied. This type of tunable acousto-optic filter is clearly distinguishable from the type with small angular aperture as described in an article entitled "New Noncollinear Acousto-Optic Tunable Filter Using Birefringence in Paratellurite" appearing on pages 256-257 of the Mar. 15, 1974 issue of *Applied Physics Letters* (Vol. 24), and in U.S. Pat. No. 3,953,107 entitled "Acousto-Optic Filters." The latter device is basically a narrowband deflector rather than a filter since its use must be restricted to well collimated light sources.

The tunable acousto-optic filters constructed so far have used birefringent crystals that include $LiNbO_3$, $CaMoO_4$, crystal quartz, $TeO_2$ and $Tl_3AsSe_3$. Tunable acousto-optic filters using these filter materials have been found to exhibit a trade-off relation between the spectral and angular bandwidths. For a tunable acousto-optic filter with a bandwidth of 10 Å in the visible spectrum region, the corresponding angular aperture is typically a few degrees.

For many applications, such as laser communications, it is desirable that the tunable acousto-optic filter can provide a very narrow bandwidth ($\sim 1$ Å) and an extremely large angular aperture ($\sim 45$ degrees). This requirement cannot be met with the prior art of tunable acousto-optic filters. Accordingly, it is fair and accurate to state that what it is needed in the art and is not available is a tunable acousto-optic filter with enhanced spectrum resolution and increased angular aperture.

DISCLOSURE OF THE INVENTION

In the present invention, it has been discovered that it may be possible to increase the spectral resolution of a tunable acousto-optic filter by utilizing a class of birefringent crystals that exhibit strong wavelength dispersion of birefringence in the spectral band of interest.

Therefore, an object of the present invention is to provide a tunable acousto-optic filter with high spectral resolution.

Another object of this invention is to provide a tunable acousto-optic filter with increased angular aperture.

A further object of this invention is to provide a tunable acousto-optic filter with a large resolution-solid angle product.

DESCRIPTION OF THE PREFERRED EMBODIMENTS

Figure 1:
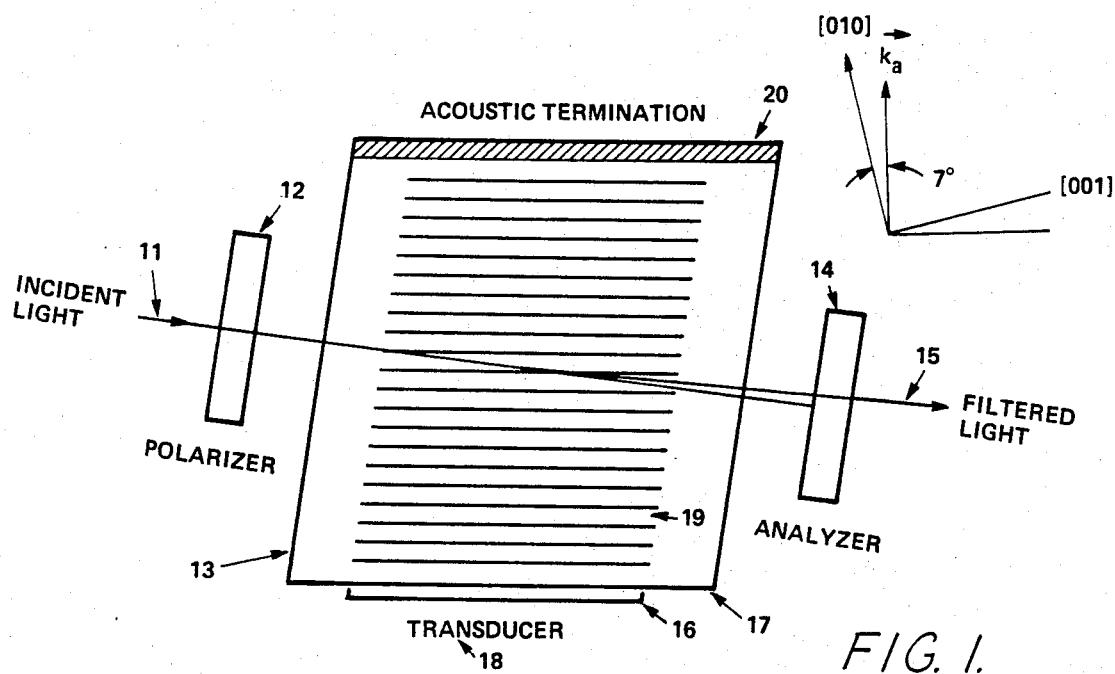
FIG. 1 shows a schematic representation of a dispersive acousto-optic filter in accordance with the present invention.

Referring to FIG. 1 in greater detail, a configuration of the noncollinear tunable acousto-optic filter of the present invention is shown diagrammatically. An input cone of light 11 which may be generated by either a narrowband coherent source such as a laser or a broadband incoherent source such as a glow discharge tube propagates through an input polarizer 12 which establishes a desired linear polarization for the light, a birefringent crystal 13 that exhibits anomalous birefringence dispersion, a term to be defined below, and an optical analyzer 14. It emerges as the output light beam 15. At least one acoustical transducer 16 is mounted in close contact with the crystal on a surface of chosen orientation 17 and is connected to a suitable radio frequency source 18 such as voltage-controlled oscillator. The acoustic wave 19 generated at the transducer is launched into the crystal medium 13 and absorbed by the acoustic termination 20. The direction and frequency of the acoustic wave are properly chosen so that the incident light is effectively diffracted under noncritical phase matching conditions for a cone of incident angles and a narrowband of optical frequencies.

It has been shown that the angular bandwidth $\Delta\alpha$ and the spectral bandwidth $\Delta\lambda$ of the tunable acousto-optic filter are given by $$\Delta\alpha = 2n\sqrt{\frac{\lambda_o}{L\Delta n F(\theta_i)}} \quad (1)$$

$$\Delta\lambda = \frac{1.8\pi\lambda_o^2}{bL\sin^2\theta_i} \quad (2)$$

respectively, where n is the refractive index, $\lambda_o$ is the optical wavelength in vacuum, L is the interaction length, $\Delta n$ is the birefringence, $\theta_i$ is the polar angle of the incident light relative to the crystal C-axis, $F(\theta_i)$ is an angular dependent correction factor, and b is the dispersive constant, $$b = 2\pi\left(\Delta n - \lambda_o \frac{\partial}{\partial \lambda_\phi}(\Delta n)\right) \quad (3)$$

Derivation of equations (1) and (2) was given in an article entitled "Acousto-Optic Tunable Filter" appearing on pages 824–829 in the November/December, 1981 issue of *Optical Engineering* (Vol. 20, No. 6).

In all prior art tunable acousto-optic filters, the birefringent crystal materials used have negligible wavelength dispersion of birefringence. In the case of crystal quartz, for example, $\Delta n/\lambda_o$ is about 1.7 $(10^{-6})$A$^{-1}$ at 532 nm whereas $\partial\Delta n/\partial\lambda_o$ is about $-1.6(10^{-7})$A$^{-1}$. The dispersion constant is then dominated by the first term in equation (3), i.e., $b \approx 2\pi\Delta n$. In this case the birefringent crystal is said to exhibit normal birefringence dispersion. The filter bandwidth, equation (2), then becomes, $$\Delta\lambda = \frac{0.9\lambda_o^2}{\Delta n L\sin^2\theta_i} \quad (4)$$

Equations (1) and (4) yield a trade-off relation between the angular and spectral bandwidth of the tunable acousto-optic filter, $$\Delta\alpha = 2n\sin\theta_i\sqrt{\frac{\Delta\lambda}{F\lambda_o}} \quad (5)$$

Equation (5) states that the angular bandwidth is proportional to the square root of spectral bandwidth. Thus, a tunable acousto-optic filter having a narrow spectral bandwidth must have a correspondingly small angular aperture.

A parameter commonly used to characterize the performance of optical filters it the resolution-solid angle product which is defined as $$\text{Resolution-solid angle product} = \Omega\left(\frac{\lambda_o}{\Delta\lambda}\right) \quad (6)$$

where $\Omega = \pi/4(\Delta\alpha)^2$ is the solid angle accepted by the filter. Consider, for example, a noncollinear TeO$_2$ acousto-optic filter with the design $\theta_i = 20.7°$. This filter was described in an article entitled "Noncollinear Acousto-Optic Filter with Large Angular Aperture" appearing on pages 370–372 of the Oct. 15, 1974 issue of the *Applid Physics Letters* (Vol. 25). The filter was measured at 6328 Å and demonstrated a half-power bandwidth of 40 Å at an f/4 ($\pm7°$) aperture. From equation (6), the resolution-solid angle product is found to be about 7.4.

Figure 2:
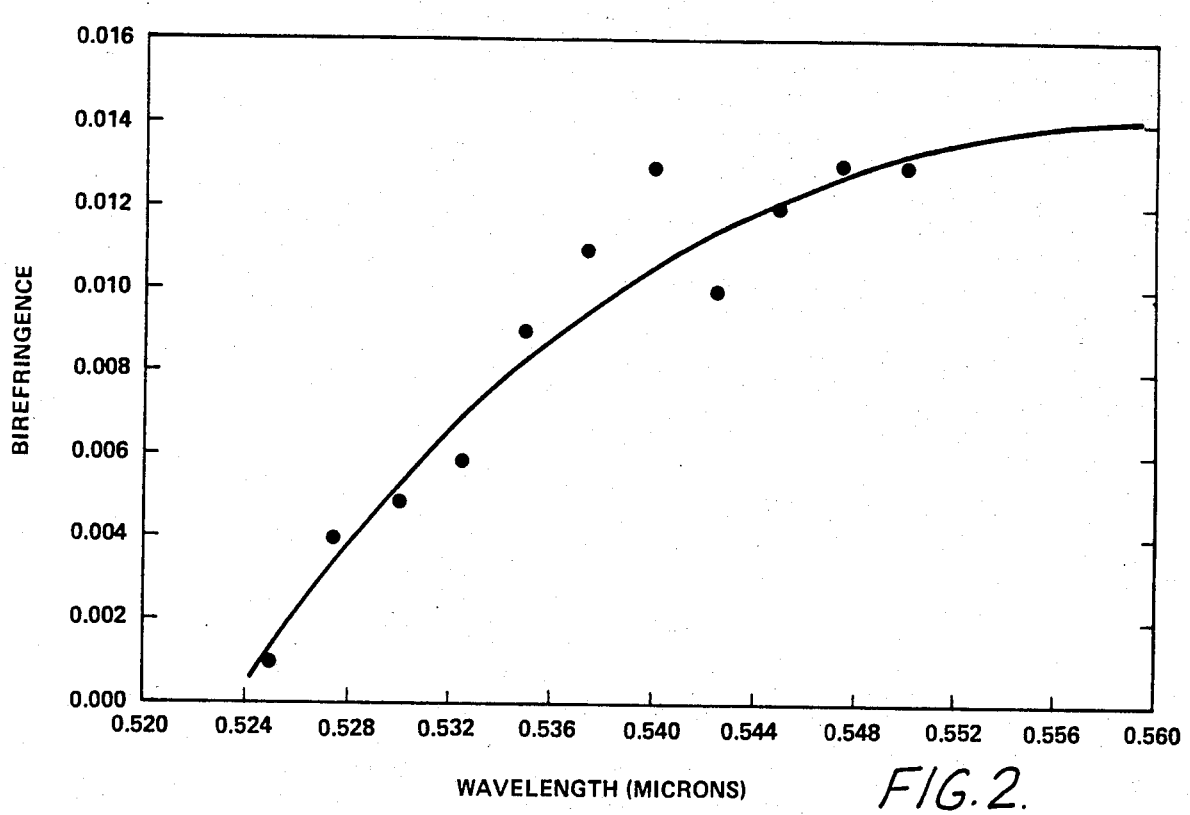
FIG. 2 show a plot of birefringence of CdS versus optical wavelength.

In the spectral region near the absorption band edge, certain uniaxial semiconductors, such as CdS, and AgGaS$_2$, are found to exhibit large dispersion of birefringence. FIG. 2 shows a plot of the birefringence of CdS as a function of wavelength. From 540 to 515 nanometer, the birefringence of CdS changes from 0.013 to $-0.017$, passing through zero (isotropic point) at 524 nanometer. Near the isotropic point, the birefringence is small, but exhibits a large derivative with respect to change of wavelength. At $\lambda_o = 532$ nm, $\Delta n/\lambda_o$ is only 1.5 $(10^{-6})$A$^{-1}$ whereas $\partial\Delta n/\partial\lambda_o$ is 5.5 $(10^{-5})$A$^{-1}$. The second term of equation (3) dominates and $b \approx -2\pi\lambda_o(\partial\Delta n/\partial\lambda)$. Hereinafter, a birefringent crystal is said to exhibit anomalous birefringence dispersion when the dispersive constant b is approximately given by $b = -2\pi\lambda_o(\partial\Delta n/\partial\lambda)$. Compared to the birefringent crystals used in conventional tunable acousto-optic filters utilizing normal birefringence dispersion, the dispersive constant b can be increased by more than one order of magnitude. Thus, it is possible to realize a large enhancement of spectral resolution in tunable acousto-optic filters by utilizing birefringent crystals that exhibit anomalous birefringence dispersion.

For the acousto-optic filter utilizing anomalous birefringence dispersion, the spectral bandwidth is now given by $$\Delta\lambda = \frac{0.9\lambda_o^2}{G\Delta n L\sin^2\theta_i} \quad (7)$$

where $$G = \frac{\lambda_o}{\Delta n}\frac{\partial}{\partial\lambda}(\Delta n)$$

is the resolution enhancement factor due to anomalous birefringence dispersion. For example, consider an acousto-optic filter using CdS as the interaction medium. At $\lambda = 532$ nm, $\Delta n/\lambda_o$ is approximately $1.5(10^{-6})$A$^{-1}$ whereas $\partial\Delta n/\partial\lambda$ is $5.5(10^{-5})$A$^{-1}$. This yeilds an enhancement factor for the filter resolution, $G \approx 37$. The resolution-solid angle product is increased by the same factor.

Figure 3:
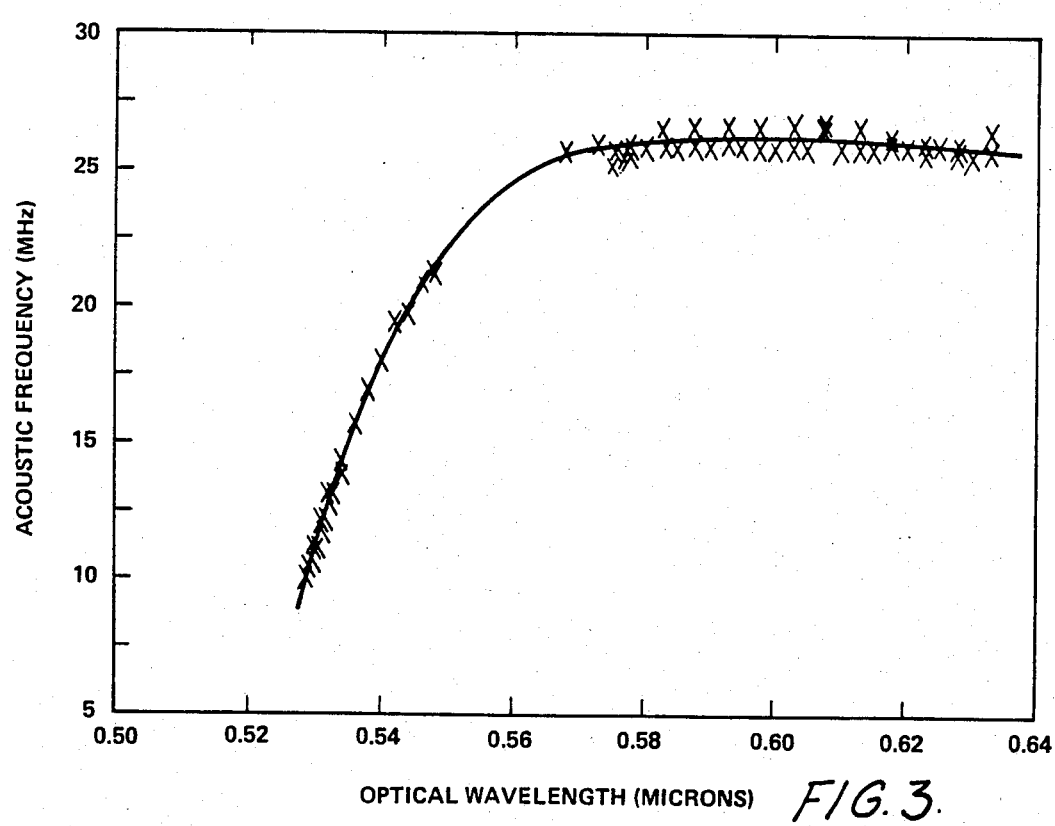
FIG. 3 shows the measured tuning curve of a CdS tunable acousto-optic filter.

The enhancement of acousto-optic filter resolution utilizing birefringence dispersion has been demonstrated experimentally. A CdS acousto-optic filter was constructed using a noncollinear geometry shown schematically in FIG. 1. The chosen acoustic wave is a pure shear mode propagating in the (100) plane and making an angle 10 degrees from the (010) axis. Linearly polarized light is incident at approximately 10.7 degrees with respect to the acoustic wavefront. The optical passband of the filter was tuned by changing the frequency of the acoustic waves. The tuning curve of the CdS acousto-optic filter is shown in FIG. 3. From 545 to 530 nanometer the acoustic frequency decreases linearly with the optical wavelength at a rate of 1.2 MHz/nm. The frequency bandwidth of the filter was measured to be approximately 2 MHz, which corresponds to a filter passband of 17 Å. The half-power bandwidth was also measured by a scanning monochrometer and was determined to be approximately 20 Å. The passband wavelength of the CdS acousto-optic filter was found to be insensitive to the angle of incidence. The total angular aperture of the filter was measured to be approximately 38 degrees. The resolution-solid angle product is determined to be 108. This is more than one order of magnitude greater than the conventional tunable acousto-optic filters with a similar design. It may be noted that a further increase of resolution and angular aperture can be obtained with the choice of $\theta_i \approx 55°$. Theoretically, this design in a CdS acousto-optic filter would lead to a passband of 1 Å and an angular aperture greater than 50°.

The above experiment was the first ever demonstrated on anisotropic acousto-optic diffraction involving anomalous birefringent dispersion. It clearly demonstrated the advantage of resolution enhancement utilizing anomalous birefringence dispersions. The experiment was conducted using a tunable acouto-optic filter for which the interaction satisfies the noncritical phase-matching condition. It is obvious, however, the method of resolution enhancement was by no means restricted to the tunable acousto-optic filter structure and is applicable to a broader class of birefringent acousto-optic devices.

In the above description of dispersive tunable acousto-optic filters, CdS was chosen as the filter interaction medium. There exist other uniaxial semiconductors that exhibit anomalous birefringence dispersion near their isotropic points. A list of these birefringent crystals besides CdS includes $AgGaS_2$, $CdGa_2S_4$ and mixed crystals of $CdS_{1-x}Se_x$ and $Zn_xCd_{1-x}S$.

While what has been described above are presently most preferred embodiments, it should be understood that the invention can take many other forms. For example, the light diffracting structure described could be used as a light modulator, or as the small angular aperture type device described in U.S. Pat. No. 3,953,107 entitled "Acousto-Optic Filters." Because many additions, modifications and alterations can be made without departing from the present invention, it should be undersood that the invention should be limited only insofar as required by the scope of the following claims.

I claim:

1. An acousto-optic apparatus for diffracting a portion of incident light from a first polarization to a second polarization within a passband of optical frequencies said apparatus comprising: a birefringent crystal, means for making a light beam incident on said crystal, said light beam passing through said crystal along a selected axis oriented at a nonzero angle with the optic axis of said crystal, means for exciting an acoustic wave in said crystal, the frequency of said acoustic wave being selected to define a center wavelength of said optical passband such that the sum of momentum vectors of said incident light and said acoustic wave are equal to the momentum vector of the diffracted light, means for changing said acoustic frequency to vary said center wavelength of said optical passband, and means for narrowing said optical passband by selecting said birefringent crystal such that the magnitude of $\partial \Delta n/\partial \lambda$ is at least five times as large as that of $\Delta n/\lambda_o$, where $\Delta n$ is the birefringence, $\lambda_o$ is the wavelength of incident light and $\partial \Delta n/\partial \lambda$ is the derivative of birefringence with respect to wavelength 2. Apparatus of claim 1 including means for selecting the direction of the acoustic wave so that the tangents to the locus of the wavevectors for the incident light and diffracted light are substantially parallel.

3. Apparatus as in claim 1 wherein the said crystal comprises CdS.

4. Apparatus as in claim 1 wherein the said crystal comprises $AgGaS_2$.

5. Apparatus as in claim 1 wherein the said crystal comprises $CdGa_2S_4$.

6. Apparatus as in claim 1 wherein the said crystal comprises $CdS_{1-x}Se_x$ compound where x ranges from 0 to 1.

7. Apparatus as in claim 1 wherein the said crystal comprises $Zn_xCd_{1-x}S$ compound where x ranges from 0 to 1.

8. The apparatus of claim 2 wherein said apparatus comprises an electronically tunable optical filter.

* * * * *